US009011306B2

(12) United States Patent
Mizumoto et al.

(10) Patent No.: US 9,011,306 B2
(45) Date of Patent: Apr. 21, 2015

(54) SEMICONDUCTIVE ROLLER

(75) Inventors: Yoshihisa Mizumoto, Kobe (JP); Takashi Marui, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 267 days.

(21) Appl. No.: 13/337,342

(22) Filed: Dec. 27, 2011

(65) Prior Publication Data

US 2012/0202663 A1 Aug. 9, 2012

(30) Foreign Application Priority Data

Feb. 7, 2011 (JP) ................................. 2011-024211

(51) Int. Cl.
*F16C 13/00* (2006.01)
*G03G 15/08* (2006.01)

(52) U.S. Cl.
CPC .................................. *G03G 15/0818* (2013.01)

(58) Field of Classification Search
CPC .......... G03G 15/0818; G03G 15/0233; G03G 15/2057
USPC ................. 492/18, 56, 59; 399/279, 280, 286
See application file for complete search history.

(56) References Cited

U.S. PATENT DOCUMENTS

| | | | | |
|---|---|---|---|---|
| 5,733,235 | A | 3/1998 | Waku et al. | |
| 6,319,181 | B1 * | 11/2001 | Naoi et al. | 492/56 |
| 7,228,094 | B2 * | 6/2007 | Jaskowiak et al. | 399/266 |
| 7,603,067 | B2 * | 10/2009 | Mizumoto | 399/286 |
| 7,627,276 | B2 * | 12/2009 | Anan et al. | 399/286 |
| 2007/0041752 | A1 | 2/2007 | Mizumoto et al. | |
| 2009/0010684 | A1 * | 1/2009 | Satoh et al. | 399/286 |

FOREIGN PATENT DOCUMENTS

| | | | | |
|---|---|---|---|---|
| JP | 8-292640 | A | 11/1996 | |
| JP | 9-114189 | A | 5/1997 | |
| JP | 10-254215 | A | 9/1998 | |
| JP | 2000-265008 | A | 9/2000 | |
| JP | 2000-336212 | A | 12/2000 | |
| JP | 2002-278320 | A | 9/2002 | |
| JP | 2007-72445 | A | 3/2007 | |
| JP | 2009198768 | A * | 9/2009 | G03G 15/16 |
| WO | WO 97/43698 | A1 | 11/1997 | |

* cited by examiner

*Primary Examiner* — Sarang Afzali
(74) *Attorney, Agent, or Firm* — Birch, Stewart, Kolasch & Birch, LLP

(57) ABSTRACT

The semiconductive roller according to the present invention includes a nonporous roller body made of a rubber composition containing styrene-butadiene rubber and epichlorohydrin rubber as rubber components.

2 Claims, 1 Drawing Sheet

SEMICONDUCTIVE ROLLER

BACKGROUND OF THE INVENTION

1. Field of the Invention

The present invention relates to a semiconductive roller suitably employable as a developing roller or a charging roller in an image forming apparatus, such as a laser printer, an electrostatic copier, a plain paper facsimile or a composite machine thereof, for example, utilizing electrophotography.

2. Description of Related Art

Various types of image forming apparatuses utilizing electrophotography are increasingly improved, in order to satisfy requirements for speed increase, improvement in picture quality, colorization and downsizing.

The key to such improvements is toner. In other words, refinement of the toner, uniformization of the particle diameter of the toner, and sphericalization of the toner shape are necessary, in order to satisfy the requirements.

As to the refinement of the toner, fine toner having an average particle diameter of not more than 10 μm or not more than 5 μm has been developed. As to the sphericalization of the toner shape, toner having sphericity exceeding 99% has been developed.

In order to further improve the quality of formed images, polymerized toner is increasingly employed in place of the conventional pulverized toner. The polymerized toner exhibits extremely excellent dot reproducibility particularly in imaging of digital information, to enable formation of high-quality images.

In an image forming apparatus, a charging roller for uniformly charging a surface of a photosensitive body or a developing roller for developing an electrostatic latent image formed by exposing the charged surface of the photosensitive body into a toner image is employed.

A roller including a roller body made of a crosslinked substance of a rubber composition prepared by blending an electronic conductivity supplier such as conductive carbon black into a rubber component and a shaft made of a metal or the like inserted into the center of the roller body, for example, is generally employed as the developing roller or the charging roller.

In particular, a semiconductive roller having roller resistance adjusted to not more than $10^8\Omega$ is effectively employed as the developing roller, in order to supply high chargeability to the toner in response to the refinement of the toner, the uniformization of the particle diameter of the toner and the sphericalization of the toner shape or the transition to the polymerized toner, and in order to efficiently develop the electrostatic latent image into the toner image without adhering the toner to the roller body.

Further, the semiconductive roller having the roller resistance adjusted in the above range is effectively employed also as the charging roller, in order to effectively charge the surface of the photosensitive body or the like with the minimum power consumption in a short time.

In order to satisfy various requirements of the semiconductive roller, studies are conducted as to the type of the rubber component constituting the rubber composition as well as the type, the compounding ratio and the structure of an additive, for example.

In order to manufacture the semiconductive roller with the highest possible productivity at a low cost, for example, the roller body is preferably nonporously formed in a single-layer structure.

In order to form a high-quality image by suppressing reduction in the quantity of charge of the toner in a case of employing a semiconductive roller including such a nonporous roller body having a single-layer structure as a developing roller, employment of ion-conductive rubber such as chloroprene rubber or epichlorohydrin rubber, for example, as a rubber component is studied.

If a semiconductive roller including a roller body made of a rubber composition containing ion-conductive rubber as a rubber component is used as a developing roller in practice for forming an image, however, the density of the formed image is reduced due to adhesion of the toner to the roller body.

SUMMARY OF THE INVENTION

Patent Document 1 (Japanese Unexamined Patent Publication No. 2007-72445) proposes a technique of blending a filler (titanium oxide or the like) having a function of preventing adhesion of the toner into the rubber composition, in order to ensure a moderate image density by suppressing reduction in the image density resulting from adhesion of the toner. However, the effect is not sufficiently attained by merely blending the filler in a small quantity.

If the compounding ratio of the filler is increased up to a range for sufficiently attaining the effect, on the other hand, the hardness of the roller body is increased to cause another problem. In other words, the toner is easily deteriorated to reduce image durability, or a nip width is reduced when the roller body is brought into pressure contact with the surface of the photosensitive body, to lower the quality of the formed image.

The image durability is an index indicating how long the quality of the image can be kept excellent when the same toner is repeatedly used for image formation. The toner stored in a developing portion of the image forming apparatus is only partially used for single image formation, and the most part of the toner is repeatedly circulated in the developing portion. Therefore, the key to improvement of the image durability is how seriously the toner is damaged (or not damaged) by the developing roller provided in the developing portion to repeatedly come into contact with the same.

When the image durability is reduced, fogging is easily caused in the formed image. The fogging is such a phenomenon that the deteriorated toner spreads also on margins of the formed image to reduce the quality of the image.

While a foaming agent or the like may conceivably be blended into the rubber composition for bringing the roller body into a porous structure having flexibility, such a porous roller body has a shorter life than the nonporous roller body, and hence the same must disadvantageously be frequently exchanged due to flattening or the like caused in a relatively short period.

Patent Document 2 (Japanese Unexamined Patent Publication No. 9-114189 (1997)) proposes a semiconductive roller including a roller body of a two-layer structure prepared by stacking a surface layer having a sea-island structure made of a mixture of acrylonitrile-butadiene rubber (NBR) and styrene-butadiene rubber (SBR) which are incompatible with each other and containing an ion conducting agent on an outer peripheral surface of a conductive elastic body layer.

As examples of the ion conducting agent, lithium perchlorate, sodium perchlorate, calcium perchlorate, long chain alkyl quaternary ammonium perchlorate and the like are illustrated.

A semiconductive roller of a single-layer structure may conceivably be formed by employing the structure of the resistance layer. In this case, adhesion of the toner can be prevented due to absence of ion-conductive rubber, while maintaining low roller resistance with the ion conducting agent.

In the structure of the resistance layer, however, the ion conducting agent easily bleeds on the surface when an electric field is continuously applied thereto or the ion conducting agent is exposed to a high temperature, for example, and the bleeding ion conducting agent transfers to the surface of the photosensitive body or the like to disadvantageously reduce the quality of the formed image.

Patent Document 3 (Japanese Unexamined Patent Publication No. 2002-278320) proposes a semiconductive roller including a roller body of a two-layer structure prepared by stacking a surface layer made of a fluorine-based material on an outer peripheral surface of an elastic layer made of a mixture of ethylene-propylene-diene rubber (EPDM), NBR and SBR and containing conductive carbon black (a carbon conductive substance).

If only the conductive carbon black is used as a conducting agent to supply electronic conductivity, however, the roller resistance cannot be stabilized unless the roller body is brought into the multilayer structure by covering the outer peripheral surface of the elastic layer with the surface layer as described above. In other words, the roller body cannot be brought into a single-layer structure, and the numbers of manufacturing steps and used materials are so increased that the productivity of the semiconductive roller is reduced and the manufacturing cost therefor is increased.

An object of the present invention is to provide a semiconductive roller including a nonporous roller body which is flexible, exhibiting a high quantity of charge of toner and hardly causing reduction of an image density resulting from adhesion of the toner to the roller body when employed as a developing roller, for example, and having excellent image durability and the like.

In order to solve the aforementioned problem, the inventor has made a study on the combination of rubber components contained in a rubber composition for forming a roller body in particular, to find that SBR may be employed along with epichlorohydrin rubber included in ion-conductive rubber as the rubber components.

The SBR has lower electric resistance as compared with other rubber components such as NBR, for example, and hence the compounding ratio of the epichlorohydrin rubber necessary for forming a roller body having the same roller resistance can be reduced.

When a nonporous roller body is formed by employing the two types of rubber components, therefore, reduction of an image density or the like resulting from adhesion of toner to the roller body mainly caused by the epichlorohydrin rubber can be suppressed while maintaining an excellent quantity of charge of the toner if the semiconductive roller including the roller body is employed as a developing roller.

Further, excellent flexibility of the roller body can also be maintained despite the nonporosity by minimizing the loading of a filler. Thus, image durability can be improved by suppressing deterioration of the toner, and reduction of the quality of a formed image can also be suppressed.

Accordingly, the present invention provides a semiconductive roller including a nonporous roller body made of a rubber composition containing styrene-butadiene rubber and epichlorohydrin rubber as rubber components.

The compounding ratio of the styrene-butadiene rubber is preferably not less than 10 parts by mass and not more than 80 parts by mass with respect to 100 parts by mass of the total quantity of the rubber components.

If the compounding ratio of the styrene-butadiene rubber is less than the above range, the quantity of the epichlorohydrin rubber is so relatively increased that the toner may easily adhere to the roller body to reduce the density of the formed image when the semiconductive roller is used as a developing roller.

If the compounding ratio of the styrene-butadiene rubber exceeds the above range, on the other hand, the quantity of the epichlorohydrin rubber is so relatively reduced that the roller resistance may be increased to reduce the quantity of charge of the toner when the semiconductive roller is used as a developing roller.

The rubber composition preferably further contains at least one type of polar rubber selected from a group consisting of NBR, chloroprene rubber (CR), butadiene rubber (BR) and acrylic rubber (ACM). The roller resistance of the roller body can be finely adjusted by also employing the polar rubber.

The rubber composition preferably further contains EPDM as still another rubber component. The semiconductive roller can be protected against deterioration caused by heat, water, ozone or the like when used in an image forming apparatus, due to the employment of the EPDM.

As hereinabove described, the roller body is preferably nonporously formed in a single-layer structure in order to manufacture the semiconductive roller with the highest possible productivity at a low cost. Also in the present invention, the roller body is preferably nonporously formed basically in a single-layer structure, similarly to the prior art. However, an oxide film may be formed on an outer peripheral surface of the roller body.

When an oxide film is formed on the outer peripheral surface of the roller body, the oxide film functions as a dielectric layer so that the dielectric loss tangent of the semiconductive roller can be reduced. When the semiconductive roller is used as a developing roller, the oxide film serves as a low friction layer so that adhesion of the toner can be further suppressed.

Further, the oxide film can be easily formed by applying ultraviolet rays to the outer peripheral surface of the roller body in an oxidizing atmosphere, for example, whereby reduction of the productivity of the semiconductive roller and increase in the manufacturing cost therefor can be suppressed to the utmost.

The semiconductive roller according to the present invention is preferably employed as a developing roller for developing an electrostatic latent image formed on a surface of a photosensitive body into a toner image with charged toner in an image forming apparatus utilizing electrophotography, as hereinabove described.

However, the semiconductive roller according to the present invention can also be used as a charging roller or the like for uniformly charging the surface of the photosensitive body in the image forming apparatus.

According to the present invention, a semiconductive roller including a nonporous roller body which is flexible, exhibiting a high quantity of charge of toner and hardly causing reduction of an image density resulting from adhesion of the toner to the roller body when employed as a developing roller, for example, and having excellent image durability and the like can be provided.

The foregoing and other objects, features and effects of the present invention will become more apparent from the following detailed description of the embodiments with reference to the attached drawings.

DETAILED DESCRIPTION OF PREFERRED EMBODIMENTS

Figure 1:
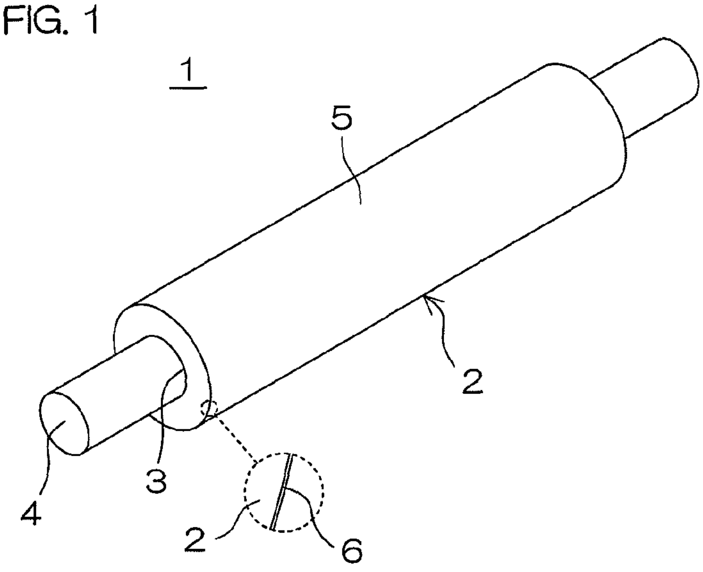
FIG. 1 is a perspective view showing a semiconductive roller according to an embodiment of the present invention.

The semiconductive roller according to the present invention includes a nonporous roller body made of a rubber composition containing styrene-butadiene rubber and epichlorohydrin rubber as rubber components.

(SBR)

As the SBR, any SBR synthesized by copolymerizing styrene and 1,3-butadiene by a method such as emulsion polymerization, solution polymerization or the like is usable. Further, either oil-extended SBR adjusted in flexibility by adding extender oil or non-oil-extended SBR containing no extender oil is usable as the SBR.

In addition, any of high styrene SBR, medium styrene SBR and low styrene SBR classified by styrene contents can be used as the SBR. Various physical properties of the roller body can be adjusted by varying the styrene content and the degree of crosslinking.

One or more of such SBR materials can be used.

The compounding ratio of the SBR is preferably not less than 10 parts by mass with respect to 100 parts by mass of the total quantity of the rubber components, and preferably not more than 80 parts by mass.

If the compounding ratio of the SBR is less than the above range, the quantity of the epichlorohydrin rubber is so relatively increased that the toner may easily adhere to the roller body to reduce the density of a formed image when the semiconductive roller is used as a developing roller.

If the compounding ratio of the SBR exceeds the above range, on the other hand, the quantity of the epichlorohydrin rubber is so relatively reduced that the roller resistance may be increased to reduce the quantity of charge of the toner when the semiconductive roller is used as a developing roller.

(Epichlorohydrin Rubber)

The epichlorohydrin rubber can be prepared from any polymer containing epichlorohydrin as a repeating unit.

The epichlorohydrin rubber can be prepared from one or more of an epichlorohydrin homopolymer, an epichlorohydrin-ethylene oxide bicopolymer, an epichlorohydrin-propylene oxide bicopolymer, an epichlorohydrin-allyl glycidyl ether bicopolymer, an epichlorohydrin-ethylene oxide-allyl glycidyl ether tercopolymer, an epichlorohydrin-propylene oxide-allyl glycidyl ether tercopolymer, an epichlorohydrin-ethylene oxide-propylene oxide-allyl glycidyl ether quaterpolymer and the like, for example.

The epichlorohydrin rubber is particularly preferably prepared from a copolymer containing ethylene oxide, and the ethylene oxide content in such a copolymer is preferably 30 to 90 mole %, more preferably 55 to 95 mole %, and particularly preferably 60 to 80 mole %.

While the ethylene oxide has a function of reducing electric resistance, the effect of reducing the electric resistance is small if the ethylene oxide content is less than the above range. If the ethylene oxide content exceeds the above range, on the other hand, the ethylene oxide is crystallized to hinder segment motion of molecular chains, and hence the electric resistance tends to increase to the contrary. Further, hardness of the roller body may be increased after crosslinking, or viscosity of the rubber composition before the crosslinking may be increased in heating/melting.

The epichlorohydrin rubber is particularly preferably prepared from the epichlorohydrin-ethylene oxide bicopolymer (ECO).

The ethylene oxide content in the ECO is preferably 30 to 80 mole %, and particularly preferably 50 to 80 mole %. Further, the epichlorohydrin content in the ECO is preferably 20 to 70 mole %, and particularly preferably 20 to 50 mole %.

The epichlorohydrin rubber can also be prepared from the epichlorohydrin-ethylene oxide-allyl glycidyl ether tercopolymer (GECO).

The ethylene oxide content in the GECO is preferably 30 to 95 mole %, and particularly preferably 60 to 80 mole %. Further, the epichlorohydrin content in the GECO is preferably 4.5 to 65 mole %, and particularly preferably 15 to 40 mole %. In addition, the allyl glycidyl ether content in the GECO is preferably 0.5 to 10 mole %, and particularly preferably 2 to 6 mole %.

A denatured substance prepared by denaturing an epichlorohydrin-ethylene oxide copolymer (ECO) with allyl glycidyl ether is also known as the GECO in addition to a copolymer in a narrow sense prepared by copolymerizing the three types of monomers, and either copolymer can be used in the present invention.

The compounding ratio of the epichlorohydrin rubber is preferably not less than 5 parts by mass with respect to 100 parts by mass of the total quantity of the rubber components, and preferably not more than 40 parts by mass.

If the compounding ratio of the epichlorohydrin rubber is less than the above range, the roller resistance may be so increased that the quantity of charge of the toner is reduced when the semiconductive roller is used as a developing roller.

If the compounding ratio of the epichlorohydrin rubber exceeds the above range, on the other hand, the toner may so easily adhere to the roller body that the image density of the formed image is reduced when the semiconductive roller is used as a developing roller.

(Polar Rubber)

The roller resistance of the roller body can be finely adjusted by blending the polar rubber. The polar rubber can be prepared from one or more of NBR, CR, BR and ACM, for example.

The NBR is particularly preferable. Any of low nitrile NBR, medium nitrile NBR, medium-high nitrile NBR, high nitrile NBR and extra-high nitrile NBR classified by acrylonitrile contents can be used as the NBR.

The rubber composition preferably contains the polar rubber (P) in a range satisfying the following formula (2) with respect to the SBR(S) in mass ratio:

$$S>P \quad (2)$$

If the formula (2) is not satisfied, the quantity of the SBR is so relatively reduced that the aforementioned effect resulting from the blending of the SBR may not be sufficiently attained.

The compounding ratio of the polar rubber, which can be arbitrarily set in response to the target roller resistance of the roller body in the range satisfying the above formula (2), is preferably not less than 5 parts by mass with respect to 100 parts by mass of the total quantity of the rubber components and preferably not more than 40 parts by mass in particular.

If the compounding ratio of the polar rubber is less than the above range, the effect of finely adjusting the roller resistance of the roller body may not be sufficiently attained.

If the compounding ratio of the polar rubber exceeds the above range, on the other hand, the quantity of the SBR is so relatively reduced that the aforementioned effect resulting from the blending of the SBR may not be sufficiently attained. Further, the quantity of the epichlorohydrin rubber is also so relatively reduced that the roller resistance may be increased and the quantity of charge of the toner may be reduced when the semiconductive roller is used as a developing roller.

(EPDM)

The semiconductive roller can be inhibited from deterioration resulting from heat, water, ozone or the like when used in an image forming apparatus, by blending EPDM.

The EPDM can be prepared from any EPDM obtained by adding a small quantity of third component (a diene component) to ethylene and propylene thereby introducing double bonds into main chains. Various EPDM products are proposed with different types and quantities of third components. Typical third components include ethylidene norbornene (ENB), 1,4-hexadiene (1,4-HD), dicyclopentadiene (DCP) and the like, for example. A Ziegler catalyst is generally used as a polymerization catalyst.

The compounding ratio of the EPDM is preferably not less than 5 parts by mass with respect to 100 parts by mass of the total quantity of the rubber components, and preferably not more than 20 parts by mass.

If the compounding ratio of the EPDM is less than the above range, the aforementioned effect resulting from the blending of the EPDM may not be sufficiently attained.

If the compounding ratio of the EPDM exceeds the above range, on the other hand, the quantity of the SBR is so relatively reduced that the aforementioned effect resulting from the blending of the SBR may not be sufficiently attained. Further, the quantity of the epichlorohydrin rubber is also so relatively reduced that the roller resistance may be increased and the quantity of charge of the toner may be reduced when the semiconductive roller is used as a developing roller.

(Crosslinking Agent, Accelerator and Supplement Accelerator)

A crosslinking agent for crosslinking the rubber components, an accelerator, a supplement accelerator and the like are blended into the rubber composition.

In the above, the crosslinking agent can be prepared from a sulfur-based crosslinking agent, a thiourea-based crosslinking agent, a triazine derivative-based crosslinking agent, a peroxide-based crosslinking agent, a monomer or the like. Any one of the materials may be singly employed, or not less than two thereof may be employed in combination.

The sulfur-based crosslinking agent can be prepared from powdered sulfur, an organic sulfur-containing compound or the like. The organic sulfur-containing compound can be prepared from tetramethyl thiuram disulfide, N,N-dithiobismorpholine or the like.

The thiourea-based crosslinking agent can be prepared from tetramethyl thiourea, trimethyl thiourea, ethylene thiourea or thiourea expressed as $(C_nH_{2n+1}NH)_2C{=}S$ [where n represents an integer of 1 to 10], for example.

The peroxide-based crosslinking agent can be prepared from benzoyl peroxide or the like.

The crosslinking agent is preferably prepared from both of sulfur and thiourea.

In this case, the compounding ratio of the sulfur is preferably not less than 0.1 parts by mass and particularly preferably not less than 0.2 parts by mass with respect to 100 parts by mass of the total quantity of the rubber components, and preferably not more than 5 parts by mass, and particularly preferably not more than 2 parts by mass.

If the compounding ratio of the sulfur is less than the above range, the crosslinking rate in the whole of the rubber composition is so reduced that the time required for the crosslinking may be increased and the productivity of the semiconductive roller may be reduced. If the compounding ratio of the sulfur exceeds the above range, on the other hand, compression set of the roller body may be increased after the crosslinking, or excess sulfur may bloom on the outer peripheral surface of the roller body.

The compounding ratio of the thiourea is preferably not less than 0.0009 moles and particularly preferably not less than 0.0015 moles in number of moles with respect to 100 g of the total quantity of the rubber components, and preferably not more than 0.0800 moles and particularly preferably not more than 0.0400 moles.

When the compounding ratio of the thiourea is set in the above range, blooming and contamination of the photosensitive body can be prevented and molecular motion of the rubber is not much hindered, whereby the roller resistance of the semiconductive roller can be more reduced.

The roller resistance can be reduced as the crosslinking density is increased by increasing the compounding ratio of the thiourea in the above range.

If the compounding ratio of the thiourea with respect to 100 g of the total quantity of the rubber components is less than 0.0009 moles, compression set of the roller body is hard to improve, and the roller resistance cannot be sufficiently reduced. If the compounding ratio of the thiourea exceeds 0.0800 moles, on the other hand, blooming or contamination of the photosensitive body is caused or mechanical characteristics such as breaking extension are easily reduced.

An accelerator and a supplement accelerator may be further blended, in response to the type of the crosslinking agent.

The accelerator can be prepared from one or more of inorganic accelerators such as calcium hydroxide, magnesia (MgO) and litharge (PBO) and the following organic accelerator, for example.

The organic accelerator can be prepared from one or more of a guanidine-based accelerator such as 1,3-di-o-tolyl guanidine, 1,3-diphenyl guanidine, 1-o-tolyl biguanide or di-o-tolyl guanidine salt of dicatechol borate; a thiazole-based accelerator such as 2-mercaptobenzothiazole or di-2-benzothiazolyl disulfide; a sulfenamide-based accelerator such as N-cyclohexyl-2-benzothiazyl sulfenamide; a thiuram-based accelerator such as tetramethyl thiuram monosulfide, tetramethyl thiuram disulfide, tetraethyl thiuram disulfide or dipentamethylene thiuram tetrasulfide; and a thiourea-based accelerator.

The functions of the accelerators vary with the types thereof, and hence not less than two types of accelerators are preferably employed together.

The compounding ratio of each accelerator, which can be individually set in response to the type thereof, is preferably not less than 0.1 parts by mass and particularly preferably not less than 0.5 parts by mass with respect to 100 parts by mass of the total quantity of the rubber components in general, and preferably not more than 5 parts by mass, and particularly preferably not more than 2 parts by mass.

The supplement accelerator can be prepared from one or more of a metal compound such as zinc white; aliphatic acid such as stearic acid, oleic acid or cottonseed-oil fatty acid and other well-known supplement accelerator.

The compounding ratio of the supplement accelerator is preferably not less than 0.1 parts by mass and particularly preferably not less than 0.5 parts by mass with respect to 100 parts by mass of the total quantity of the rubber components.

(Others)

Various types of additives may be further blended into the rubber composition as necessary. The additives include an acid acceptor, plastic components (a plasticizer, a process aid etc.), an antidegradant, a filler, an antiscorching agent, an ultraviolet absorber, a lubricant, a pigment, an antistatic agent, a flame retardant, a neutralizer, a nucleator, an antifoaming agent, a co-crosslinking agent and the like, for example.

The acid acceptor functions to prevent chlorine-based gas generated from the epichlorohydrin rubber in the crosslinking of the rubber components from remaining in the roller body as well as crosslinking inhibition, contamination of the photosensitive body and the like resulting therefrom.

The acid acceptor, which can be prepared from any substance acting as an acid acceptor, is preferably prepared from hydrotalcite or Magsarat having excellent dispersibility, and particularly preferably prepared from the hydrotalcite.

When the hydrotalcite or the like is employed along with magnesium oxide or potassium oxide, a higher acid accepting effect can be attained, and contamination of the photosensitive body can be more reliably prevented.

The compounding ratio of the acid acceptor is preferably not less than 0.2 parts by mass and particularly preferably not less than 1 part by mass with respect to 100 parts by mass of the total quantity of the rubber components, and preferably not more than 10 parts by mass, and particularly preferably not more than 5 parts by mass.

If the compounding ratio of the acid acceptor is less than the above range, the effect resulting from introducing the acid acceptor into the rubber composition may not be sufficiently attained. If the compounding ratio of the acid acceptor exceeds the above range, on the other hand, the hardness of the roller body may be increased after the crosslinking.

The plasticizer can be prepared from any plasticizer such as dibutyl phthalate (DBP), dioctyl phthalate (DOP) or tricresyl phosphate, wax or the like, for example.

The process aid can be prepared from aliphatic acid such as stearic acid.

The compounding ratio of the plastic components is preferably not more than 5 parts by mass with respect to 100 parts by mass of the total quantity of the rubber components, in order to prevent bleeding when the oxide film is formed on the outer peripheral surface of the roller body as necessary, or in order to prevent contamination of the photosensitive body when the semiconductive roller is mounted on an image forming apparatus or the image forming apparatus is driven, for example. In consideration of such objects, polar wax is particularly preferably used as a plastic component.

The antidegradant can be prepared from an age resistor or an antioxidant.

The antioxidant functions to reduce environment dependence of the roller resistance of the semiconductive roller and to suppress increase of the roller resistance in continuous conduction. The antioxidant can be prepared from nickel diethyldithiocarbamate [Nocrack (registered trademark) NEC-P by Ouchi Shinko Chemical Industrial], nickel dibutyldithiocarbamate [Nocrack NBC by Ouchi Shinko Chemical Industrial] or the like, for example.

When the oxide film is formed on the outer peripheral surface of the roller body and the antioxidant is blended into the rubber composition, the compounding ratio of the antioxidant is preferably properly set to efficiently progress the formation of the oxide film.

The filler can be prepared from one or more of zinc oxide, silica, carbon, carbon black, clay, talk, calcium carbonate, magnesium carbonate, aluminum hydroxide, titanium oxide and the like, for example.

Mechanical strength etc. of the roller body can be improved by blending the filler. Further, adhesion of the toner can also be suppressed by blending the titanium oxide as the filler.

In addition, electron conductivity can be supplied to the roller body by employing conductive carbon black as the filler.

The compounding ratio of the filler is preferably not more than 50 parts by mass and particularly preferably not more than 10 parts by mass with respect to 100 parts by mass of the total quantity of the rubber components, in order to supply excellent flexibility to the nonporous roller body.

The antiscorching agent can be prepared from one or more of N-cyclohexyl thiophthalimide, phthalic anhydride, N-nitrosodiphenylamine, 2,4-diphenyl-4-methyl-1-pentene and the like, for example.

The compounding ratio of the antiscorching agent is preferably not less than 0.1 parts by mass with respect to 100 parts by mass of the total quantity of the rubber components, and preferably not more than 5 parts by mass, and particularly preferably not more than 1 part by mass.

The co-crosslinking agent denotes a component crosslinking with itself and also crosslinking with the rubber components to highly polymerizing the whole.

The co-crosslinking agent can be prepared from one or more of an ethylenic unsaturated monomer represented by methacrylic ester or metal salt of methacrylic acid or acrylic acid, a multifunctional polymer utilizing a functional group of 1,2-polybutadiene, dioxime and the like, for example.

The ethylenic unsaturated monomer can be prepared from one or more of:

(a) monocarboxylic acid such as acrylic acid, methacrylic acid or crotonic acid, (b) dicarboxylic acid such as maleic acid, fumaric acid or itaconic acid, (c) ester or anhydride of the unsaturated carboxylic acid (a) or (b), (d) metal salt of the (a), (b) or (c), (e) aliphatic conjugated diene such as 1,3-butadiene, isoprene or 2-chloro-1,3-butadiene, (f) aromatic vinyl compound such as styrene, α-methyl styrene, vinyl toluene, ethyl vinyl benzene or divinyl benzene, (g) vinyl compound such as triallyl isocyanurate, triallyl cyanurate or vinyl pyridine, and (h) vinyl cyanide compound such as (meth)acrylonitrile or α-chloroacrylonitrile, acrolein, formylsterol, vinyl methyl ketone, vinyl ethyl ketone or vinyl butyl ketone, for example.

The ester (c) of the unsaturated carboxylic acid is preferably prepared from ester of monocarboxylic acid.

The ester of the monocarboxylic acid can be prepared from one or more of:

alkyl ester of (meth)acrylic acid such as methyl (meth) acrylate, ethyl(meth)acrylate, n-propyl(meth)acrylate, i-propyl(meth)acrylate, n-butyl(meth)acrylate, i-butyl (meth) acrylate, n-pentyl(meth)acrylate, i-pentyl (meth)acrylate, n-hexyl(meth)acrylate, cyclohexyl (meth)acrylate, 2-ethylhexyl(meth)acrylate, octyl (meth)acrylate, i-nonyl(meth) acrylate, tert-butylcyclohexyl (meth)acrylate, decyl(meth) acrylate, dodecyl(meth)acrylate, hydroxymethyl(meth) acrylate or hydroxyethyl(meth)acrylate;

aminoalkyl ester of (meth) acrylic acid such as aminoethyl (meth)acrylate, dimethylaminoethyl(meth)acrylate or butylaminoethyl(meth)acrylate;

meth(acrylate) having an aromatic ring such as benzyl (meth)acrylate, benzoyl(meth)acrylate or allyl (meth)acrylate;

(meth)acrylate having an epoxy group such as glycidyl (meth)acrylate, methaglycidyl(meth)acrylate or epoxycyclohexyl(meth)acrylate;

(meth)acrylate having a functional group such as N-methylol (meth) acrylamide, γ-(meth)acryloxypropyl trimethoxysilane or tetrahydrofurfuryl methacrylate; and multifunctional (meth)acrylate such as ethylene glycol di(meth)acrylate, trimethylolpropane tri(meth)acrylate, ethylene dimethacrylate (EDMA), polyethylene glycol dimethacrylate or isobutylene ethylene dimethacrylate, for example.

The rubber composition containing the components can be prepared similarly to the prior art. The rubber composition is obtained by blending the rubber components in prescribed ratios and masticating the same, thereafter kneading the mixture while adding the additives other than the crosslinking component, and finally kneading the mixture with addition of the crosslinking component. The mixture can be kneaded in a kneader, a Banburymixer or an extruder, for example.

(Semiconductive Roller)

FIG. 1 is a perspective view showing a semiconductive roller according to an embodiment of the present invention.

Referring to FIG. 1, a semiconductive roller 1 according to the embodiment includes a cylindrical roller body 2 made of the rubber composition and a shaft 4 inserted into a through-hole 3 at the center of the roller body 2.

The roller body 2 is nonporously formed. Preferably, the roller body 2 is basically formed in a single-layer structure as shown in FIG. 1, in order to manufacture the semiconductive roller 1 with the highest possible productivity at a low cost.

Alternatively, the roller body 2 may be formed in a two-layer structure of an outer layer closer to an outer peripheral surface 5 and an inner layer closer to the shaft 4, as the case may be. In this case, at least the outer layer may be made of the rubber composition.

The shaft 4 is integrally made of a metal such as aluminum, an aluminum alloy or stainless steel, for example. The roller body 2 and the shaft 4 are electrically bonded and mechanically fixed to each other with a conductive adhesive or the like, for example, to be integrally rotated.

An oxide film 6 may be provided on the outer peripheral surface 5 of the roller body 2, as shown in FIG. 1 in an enlarged manner.

When the oxide film 6 is formed on the outer peripheral surface 5, the oxide film 6 functions as a dielectric layer so that the dielectric loss tangent of the semiconductive roller 1 can be reduced. When the semiconductive roller 1 is used as a developing roller, the oxide film 6 serves as a low friction layer so that adhesion of toner can be further suppressed.

Further, the oxide film 6 can be easily formed by applying ultraviolet rays or the like to the outer peripheral surface 5 of the roller body 2 in an oxidizing atmosphere, for example, whereby reduction of the productivity of the semiconductive roller 1 and increase in the manufacturing cost therefor can be suppressed to the utmost.

However, the oxide film 6 may not be formed.

The semiconductive roller 1 can be manufactured similarly to the prior art, by employing the rubber composition containing the aforementioned components.

In other words, the rubber composition is kneaded, heated and melted through an extruder, and extruded into an elongated cylindrical shape through a die corresponding to the sectional shape, i.e., an annular shape, of the roller body 2.

Then, the roller body 2 is cooled to be hardened, and thereafter heated and vulcanized in a vulcanizer while a temporary shaft for the vulcanization is inserted into the through-hole 3.

Then, the roller body 2 is remounted on the shaft 4 having an outer peripheral surface coated with a conductive adhesive. If the adhesive is a thermosetting adhesive, the thermosetting adhesive is hardened by heating, to electrically bond and mechanical fix the roller body 2 and the shaft 4 to each other.

Then, the outer peripheral surface 5 of the roller body 2 is polished to have prescribed surface roughness as necessary and oxidized by irradiation with ultraviolet rays or the like as necessary, to form the oxide film 6 covering the outer peripheral surface 5. Thus, the semiconductive roller 1 shown in FIG. 1 is manufactured.

The semiconductive roller 1 can be built into an image forming apparatus such as a laser printer, for example, utilizing electrophotography, to be suitably used as a developing roller for developing an electrostatic latent image formed on a surface of a photosensitive body into a toner image with charged toner.

In this case, a developing roller having a high quantity of charge of the toner, hardly causing reduction of an image density resulting from adhesion of the toner to the roller body 2 and exhibiting excellent image durability etc. can be obtained.

The semiconductive roller 1 can similarly be built into the image forming apparatus, to be used as a charging roller for uniformly charging the surface of the photosensitive body.

When the semiconductive roller 1 is used as a developing roller, for example, the thickness of the roller body 2 is preferably not less than 0.5 mm, more preferably not less than 1 mm, and particularly preferably not less than 2 mm, and preferably not more than 10 mm, more preferably not more than 7 mm, and particularly preferably not more than 5 mm, in order to ensure a proper nip thickness while reducing the size and the weight of the developing roller.

The Shore A hardness of the roller body 2 is preferably not more than 60, and particularly preferably not more than 50.

If the Shore A hardness of the roller body 2 exceeds the above range, flexibility of the roller body 2 is so insufficient that neither an effect of ensuring a large nip width thereby improving developing efficiency of the toner nor an effect of reducing damage on the toner thereby improving the image durability may be sufficiently attained.

In order to supply proper strength to the roller body 2 thereby supplying proper friction resistance with respect to a seal portion or the like sliding with the outer peripheral surface 5 thereof for preventing the toner from leaking out of both ends of the roller body 2, for example, the Shore A hardness of the roller body 2 is preferably not less than 35 within the above range.

In the present invention, the Shore A hardness is expressed by a value measured by the method described in JIS K6253 under conditions of a temperature of 23° C. and a load of 1000 g applied to both ends.

In the semiconductive roller 1, roller resistance measured under conditions of the temperature of 23° C. and relative humidity of 55% with an applied voltage of 100 V is preferably not less than $10^4\Omega$ and particularly preferably not less than $10^{6.5}\Omega$, and preferably not more than $10^9\Omega$ and particularly preferably not more than $10^8\Omega$.

If the roller resistance is less than the above range, the semiconductive roller 1 so easily leaks the charge of the toner that the resolution of a formed image is reduced due to leakage of the charge in the plane direction of the formed image, for example.

If the roller resistance of the semiconductive roller 1 exceeds the above range, on the other hand, no image having a sufficient density can be formed.

The roller resistance of the semiconductive roller 1 is that before the formation of the oxide film 6, in the case of forming the oxide film 6 on the outer peripheral surface 5 of the roller body 2.

Figure 2:
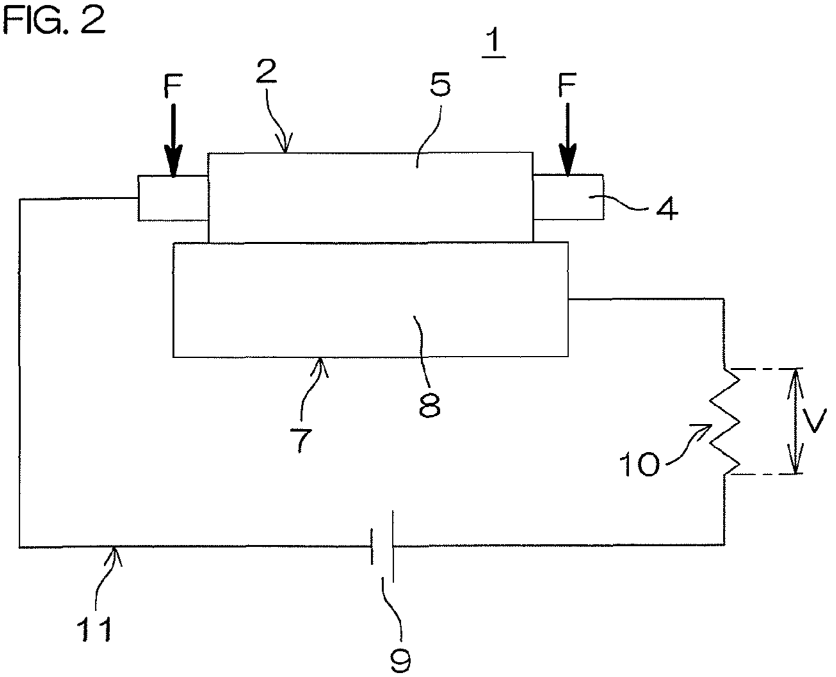
FIG. 2 illustrates a method of measuring roller resistance of the semiconductive roller.

FIG. 2 is a diagram illustrating a method of measuring the roller resistance of the semiconductive roller 1.

Referring to FIGS. 1 and 2, the roller resistance of the semiconductive roller 1 is expressed by a value measured by the following method in the present invention.

An aluminum drum 7 rotatable at a constant speed is prepared, and the outer peripheral surface 5 of the roller body 2 of the semiconductive roller 1 whose roller resistance is to be measured is brought into contact with an outer peripheral surface 8 of the aluminum drum 7 from above.

Then, a DC power source 9 and a resistor 10 are serially connected between the shaft 4 of the semiconductive roller 1 and the aluminum drum 7, thereby forming a measuring circuit 11. The minus and plus sides of the DC power source 9 are connected with the shaft 4 and the resistor 10 respectively. The resistance r of the resistor 10 is adjusted in the range of $10^2\Omega$ to $10^7\Omega$, in response to the resistance of the semiconductive roller 1.

Then, loads F of 500 g are applied to both end portions of the shaft 4 for bringing the roller body 2 into pressure contact with the aluminum drum 7, and a detection voltage V applied to the resistor 10 is measured when applying a DC voltage E of 100 V from the DC power source 9 between the shaft 4 and the aluminum drum 7 while rotating the aluminum drum 7 (at a rotational frequency of 30 rpm).

From the detection voltage V and the applied voltage E (=100 V), the roller resistance R of the semiconductive roller 1 is basically obtained by the following formula (i'):

$$R=r\times E/(V-r) \quad \text{(i')}$$

However, the term—r in the denominator of the formula (i') can be regarded as minute, and hence a value obtained by the following formula (i) is regarded as the roller resistance of the semiconductive roller 1 in the present invention.

$$R=r\times E/V \quad \text{(i)}$$

The measurement conditions are the temperature of 23° C. and the relative humidity of 55%, as described above.

The roller body 2 can be adjusted to have arbitrary compression set, in response to the application or the like of the semiconductive roller 1.

In order to adjust the characteristics such as the roller resistance of the semiconductive roller 1, the Shore A hardness of the roller body 2 and the compression set, the types, the compounding ratios etc. of the components constituting the rubber composition may be adjusted, for example.

More specifically, the types, the combination and the compounding ratios of the SBR and the epichlorohydrin rubber as well as the polar rubber as the rubber components, the type, the combination and the quantity of the crosslinking component for crosslinking the rubber components, and the types, the combination and the quantities of the additives may be adjusted.

The semiconductive roller according to the present invention can be suitably used as the developing roller or the charging roller for an image forming apparatus such as a laser printer, an electrostatic copier, a plain paper facsimile or a composite machine thereof, for example, utilizing electrophotography, for example, or may also be employed as a transfer roller, a cleaning roller or the like in the image forming apparatus.

EXAMPLES

Example 1

(Preparation of Rubber Composition)

80 parts by mass of SBR [JSR 1502 by JSR Corporation] and 20 parts by mass of GECO [Epion (registered trademark) ON301 by Daiso Co., Ltd., EO/EP/AGE=73/23/4 (molar ratio)] were blended as rubber components. The compounding ratio of the SBR with respect to 100 parts by mass of the total quantity of the rubber components was 80 parts by mass.

A rubber composition was prepared by masticating 100 parts by mass of the total quantity of the rubber components in a Banbury mixer, kneading the mixture while adding components shown in Table 1 except a crosslinking component, and further kneading the mixture while finally adding the crosslinking component.

TABLE 1

| Component | Part by Mass |
|---|---|
| Sulfur-Based Crosslinking Agent | 0.75 |
| Thiourea | 0.85 |
| Accelerator DM | 0.5 |
| Accelerator TS | 1 |
| Accelerator DT | 0.8 |
| Conductive Filler | 5 |
| Acid Acceptor | 3 |

The components shown in Table 1 are as follows:

Sulfur-based crosslinking agent: powdered sulfur

Thiourea: ethylene thiourea [2-mercaptoimidazoline, Axel (registered trademark) 22-S by Kawaguchi Chemical Industry Co., Ltd.]

Accelerator DM: di-2-benzothiazolyl disulfide [thiazole-based accelerator, Nocceler {registered trademark} DM by Ouchi Shinko Chemical Industrial]

Accelerator TS: tetramethylthiuram monosulfide (thiuram-based accelerator, Nocceler TS by Ouchi Shinko Chemical Industrial]

Accelerator DT: 1,3-di-o-tolyl guanidine [guanidine-based accelerator, Nocceler DT by Ouchi Shinko Chemical Industrial]

Conductive filler: conductive carbon black [Denka Black {registered trademark} by Denki Kagaku Kogyo K. K.]

Acid acceptor: hydrotalcite [DHT-4A (registered trademark)-2 by Kyowa Chemical Industry Co., Ltd.]

Referring to Table 1, the content of each component is shown by parts by mass with respect to 100 parts by mass of the total quantity of the rubber components.

(Preparation of Semiconductive Roller)

The rubber composition was supplied to an extruder to be extruded into a cylindrical body having an outer diameter of ϕ17.0 mm and an inner diameter of ϕ6.2 mm, and the cylindrical body was thereafter mounted on a temporarily shaft for crosslinking having an outer diameter of ϕ7.5 mm and crosslinked in a vulcanizer at 160° C. for one hour.

Then, the cylindrical body was remounted on a shaft of ϕ10 mm in outer diameter having an outer peripheral surface coated with a conductive thermosetting adhesive, and heated to 160° C. in an oven to be bonded to the shaft. Then, a roller body integrated with the shaft was formed by cutting both ends of the cylindrical body, traverse-grinding the outer peripheral surface with a cylindrical grinder, thereafter mirror-grinding the same as finishing, and finishing the cylindrical body to have an outer diameter of ϕ16 mm (tolerance: 0.05).

Surface roughness Rz of the outer peripheral surface of the roller body measured according to JIS $B0601_{-1994}$ was 5±2 μm.

Then, a semiconductive roller was manufactured by washing the ground outer peripheral surface of the roller body with water, setting the roller body in an ultraviolet irradiator [PL21-200 by Sen Lights Corporation] so that the distance from a UV lamp to the outer peripheral surface was 10 cm, and irradiating the outer peripheral surface with each of ultraviolet rays having wavelengths of 184.9 nm and 253.7 nm for five minutes while rotating the roller body on the shaft by 90° thereby forming an oxide film on the outer peripheral surface.

Example 2

A semiconductive roller was manufactured by preparing a rubber composition similarly to Example 1, except that 70 parts by mass of the SBR, 20 parts by mass of GECO and 10 parts by mass of CR [Shoprene (registered trademark) WRT by Showa Denko K. K.] were blended as rubber components. The compounding ratio of the SBR with respect to 100 parts by mass of the total quantity of the rubber components was 70 parts by mass.

Example 3

A semiconductive roller was manufactured by preparing a rubber composition similarly to Example 2, except that the quantities of the SBR and the CR were changed to 50 parts by mass and 30 parts by mass respectively. The compounding ratio of the SBR with respect to 100 parts by mass of the total quantity of the rubber components was 50 parts by mass.

Example 4

A semiconductive roller was manufactured by preparing a rubber composition similarly to Example 2, except that the quantities of the SBR and the CR were changed to 10 parts by mass and 70 parts by mass respectively. The compounding ratio of the SBR with respect to 100 parts by mass of the total quantity of the rubber components was 10 parts by mass.

Example 5

A semiconductive roller was manufactured by preparing a rubber composition similarly to Example 2, except that the quantities of the SBR and the CR were changed to 5 parts by mass and 75 parts by mass respectively. The compounding ratio of the SBR with respect to 100 parts by mass of the total quantity of the rubber components was 5 parts by mass.

Example 6

A semiconductive roller was manufactured by preparing a rubber composition similarly to Example 1, except that 70 parts by mass of the SBR, 20 parts by mass of GECO and 10 parts by mass of NBR [medium high nitrile rubber, Nipol (registered trademark) 401LL by Nippon Zeon Co., Ltd.] were blended as rubber components. The compounding ratio of the SBR with respect to 100 parts by mass of the total quantity of the rubber components was 70 parts by mass.

Example 7

A semiconductive roller was manufactured by preparing a rubber composition similarly to Example 1, except that 70 parts by mass of the SBR, 20 parts by mass of GECO and 10 parts by mass of EPDM [Espren (registered trademark) EPDM505A by Sumitomo Chemical Co., Ltd.] were blended as rubber components. The compounding ratio of the SBR with respect to 100 parts by mass of the total quantity of the rubber components was 70 parts by mass.

Comparative Example 1

A semiconductive roller was manufactured by preparing a rubber composition similarly to Example 1, except that 30 parts by mass of the NBR, 20 parts by mass of GECO and 50 parts by mass of CR were blended as rubber components.

Comparative Example 2

A semiconductive roller was manufactured by preparing a rubber composition similarly to Example 1, except that 20 parts by mass of the GECO and 80 parts by mass of CR were blended as rubber components.

<Measurement of Shore A Hardness>

Shore A hardness of the roller body of the semiconductive roller prepared according to each of Examples 1 to 7 and comparative examples 1 and 2 was measured by the method described in JIS K6253 under the conditions of the temperature of 23° C. and the load of 1000 g applied to both ends.

<Actual Service Test>

The semiconductive roller prepared according to each of Examples 1 to 7 and comparative examples 1 and 2 was exchanged for an existing developing roller of a commercially available cartridge (integrally formed by a toner container storing toner, a photosensitive body and the developing roller) for a laser printer, and subjected to the following tests at room temperature of 23° C. and relative humidity of 55%. The laser printer, using positively charged pulverized nonmagnetic one-component toner, had a printing speed of 26 (26 ppm) per minute and a capability (a printer life) of continuously forming 2600 images having a concentration of 5%.

(Measurement of Image Density)

The semiconductive roller was newly built into a cartridge, which in turn was mounted on an initial-state laser printer, for continuously forming five images having a concentration of 5% and forming a black solid image immediately after the image formation.

An average image density was obtained by measuring image densities on five arbitrary points of the formed black solid image with a reflection densitometer [a combination of Techkon RT120 and Light Table LP20 by Techkon Co., Ltd.], and the image density was evaluated according to the following criteria:

◎: Not less than 2.2. Remarkably excellent.

○: Not less than 1.8 and less than 2.2. Excellent.

Δ: Not less than 1.7 and less than 1.8. At a practical level.

X: Less than 1.7. Defective.

(Image Durability Test)

After the measurement of the image density, images having a concentration of 1% were continuously formed and every $500^{th}$ image was observed, to determine whether or not blooming was caused in margins. This operation was repeated up to the printer life, and image durability was thereafter evaluated according to the following criteria:

○: No blooming was caused up to the printer life. Image durability excellent.

X: Blooming was caused before the printer life. Image durability defective.

(Measurement of Quantity of Charge of Toner)

After a white solid image (a blank) was formed with the initial-state laser printer, the cartridge was taken out of the laser printer. Then, the toner was sucked from the semiconductive roller according to each of Examples 1 to 7 and comparative examples 1 and 2 built into the cartridge from above with a suction type q/m meter [Q/M METER Model 210HS-2 by Trek Japan Co., Ltd.], for measuring the quantity (μC) of charge and the mass (mg) of the toner. Then, the quantity (μC/g) of charge of the toner per unit mass was obtained from the quantity (μC) of charge and the mass (mg) of the toner as an initial quantity $T_0$ of charge.

Then, the quantity (μC) of charge and the mass (mg) of the toner were remeasured after continuously forming 2000 white solid images, and the quantity (μC/g) of charge of the toner per unit mass was obtained as a post-durability quantity $T_{2000}$ of charge.

<Measurement of Roller Resistance>

The roller resistance of the semiconductive roller prepared according to each of Examples 1 to 7 and comparative examples 1 and 2 was measured by the aforementioned method. Tables 2 and 3 show the roller resistance in log R.

Tables 2 and 3 show the results.

quantity of charge of the toner by combining the SBR and the GECO as the rubber components.

From the results of Examples 1 to 6, further, it has been proved that the compounding ratio of the SBR is preferably not less than 10 parts by mass and not more than 80 parts by mass with respect to 100 parts by mass of the total quantity of the rubber components.

From the results of Example 1 and Examples 2 to 6, in addition, it has been proved that the roller resistance can be finely adjusted by further blending polar rubber as a rubber component, and the compounding ratio of the polar rubber is

TABLE 2

| | | | Ex. 1 | Ex. 2 | Ex. 3 | Ex. 4 | Ex. 5 |
|---|---|---|---|---|---|---|---|
| Part by Mass | SBR | | 80 | 70 | 50 | 10 | 5 |
| | GECO | | 20 | 20 | 20 | 20 | 20 |
| | CR | | — | 10 | 30 | 70 | 75 |
| | NBR | | — | — | — | — | — |
| | EPDM | | — | — | — | — | — |
| | Sulfur-Based Crosslinking Agent | | 0.75 | 0.75 | 0.75 | 0.75 | 0.75 |
| | Thiourea | | 0.85 | 0.85 | 0.85 | 0.85 | 0.85 |
| | Accelerator DM | | 0.5 | 0.5 | 0.5 | 0.5 | 0.5 |
| | Accelerator TS | | 1 | 1 | 1 | 1 | 1 |
| | Accelerator DT | | 0.8 | 0.8 | 0.8 | 0.8 | 0.8 |
| | Conductive Filler | | 5 | 5 | 5 | 5 | 5 |
| | Acid Acceptor | | 3 | 3 | 3 | 3 | 3 |
| Evaluation | Shore A Hardness | | 48 | 44 | 47 | 49 | 50 |
| | Image Density | Numerical Value | 2.13 | 2.35 | 2.26 | 1.85 | 1.75 |
| | | Evaluation | ○ | ◎ | ◎ | ○ | Δ |
| | Image Durability | | ○ | ○ | ○ | ○ | ○ |
| | Quantity of Charge of | $T_0$ | 17.8 | 18.1 | 19.2 | 21.2 | 21.5 |
| | Toner (μC/g) | $T_{2000}$ | 10.5 | 11.3 | 11.6 | 12.8 | 13.0 |
| | Roller Resistance(logR) | | 8.1 | 7.9 | 7.6 | 7.5 | 7.3 |

TABLE 3

| | | | EX. 6 | EX. 7 | Comp. Ex. 1 | Comp. Ex. 2 |
|---|---|---|---|---|---|---|
| Part by Mass | SBR | | 70 | 70 | — | — |
| | GECO | | 20 | 20 | 20 | 20 |
| | CR | | — | — | 50 | 80 |
| | NBR | | 10 | — | 30 | — |
| | EPDM | | — | 10 | — | — |
| | Sulfur-Based Crosslinking Agent | | 0.75 | 0.75 | 0.75 | 0.75 |
| | Thiourea | | 0.85 | 0.85 | 0.85 | 0.85 |
| | Accelerator DM | | 0.5 | 0.5 | 0.5 | 0.5 |
| | Accelerator TS | | 1 | 1 | 1 | 1 |
| | Accelerator DT | | 0.8 | 0.8 | 0.8 | 0.8 |
| | Conductive Filler | | 5 | 5 | 5 | 5 |
| | Acid Acceptor | | 3 | 3 | 3 | 3 |
| Evaluation | Shore A Hardness | | 48 | 48 | 51 | 51 |
| | Image Density | Numerical Value | 2.21 | 2.24 | 1.68 | 1.46 |
| | | Evaluation | ◎ | ◎ | X | X |
| | Image Durability | | ○ | ○ | ○ | ○ |
| | Quantity of Charge of | $T_0$ | 17.6 | 17.5 | 22.7 | 21.5 |
| | Toner (μC/g) | $T_{2000}$ | 11.5 | 10.9 | 12.4 | 12.6 |
| | Roller Resistance (logR) | | 8.2 | 8.3 | 8.8 | 8.5 |

From the results of comparative examples 1 and 2 shown in Table 3, it has been proved that no effect of suppressing reduction of the image density resulting from adhesion of the toner to the roller body with the SBR is attained if the CR and the NBR as the polar rubber are combined with the GECO as the rubber components in place of the SBR.

From the results of Examples 1 to 7 shown in Tables 2 and 3, on the other hand, it has been proved that the reduction of the image density resulting from adhesion of the toner to the roller body can be suppressed while maintaining an excellent preferably less than the compounding ratio of the SBR and not less than 5 parts by mass and not more than 40 parts by mass with respect to 100 parts by mass of the total quantity of the rubber components.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2011-24211 filed with the Japan Patent Office on Feb. 7, 2011, the disclosure of which is incorporated herein by reference.

What is claimed is:

1. A semiconductive roller comprising a nonporous roller body made of a rubber composition containing as rubber components (i) styrene-butadiene rubber, (ii) epichlorohydrin rubber, (iii) ethylene-propylene-diene rubber, and (iv) at least one type of polar rubber selected from the group consisting of acrylonitrile-butadiene rubber, chloroprene rubber, butadiene rubber, and acrylic rubber, wherein the compounding ratio of the styrene-butadiene rubber is not less than 10 parts by mass and not more than 80 parts by mass with respect to 100 parts by mass of the total quantity of the rubber components, the roller body includes an oxide film on an outer peripheral surface thereof, and roller resistance of the semiconductive roller is not less than $10^4\Omega$ and not more than $10^9\Omega$.

2. The semiconductive roller according to claim 1, employed as a developing roller for developing an electrostatic latent image formed on a surface of a photosensitive body into a toner image with charged toner in an image-forming apparatus utilizing electrophotography.

* * * * *